United States Patent [19]

Rentschler et al.

[11] Patent Number: 5,177,688

[45] Date of Patent: Jan. 5, 1993

[54] ASSEMBLY LINE BALANCER

[75] Inventors: David Rentschler; David B. Stevens, both of Austin, Tex.

[73] Assignee: Texas Instruments Incorporated, Dallas, Tex.

[21] Appl. No.: 821,331

[22] Filed: Jan. 13, 1992

Related U.S. Application Data

[63] Continuation of Ser. No. 444,646, Dec. 1, 1989, abandoned.

[51] Int. Cl.$^5$ .............................................. G06F 15/46
[52] U.S. Cl. ...................................... 364/468; 364/401
[58] Field of Search .............. 364/138, 148, 468, 401, 364/403, 474.11; 395/550, 912, 919

[56] References Cited

U.S. PATENT DOCUMENTS

| | | | |
|---|---|---|---|
| 4,459,663 | 7/1984 | Dye | 364/403 |
| 4,561,060 | 12/1985 | Hemond | 364/478 |
| 4,591,983 | 5/1986 | Bennett et al. | 364/468 |
| 4,747,130 | 5/1988 | Ho | 379/269 |
| 4,802,094 | 1/1989 | Nakamura et al. | 364/468 |
| 4,887,218 | 12/1989 | Natarajan | 364/468 |
| 4,896,269 | 1/1990 | Tong | 364/468 |
| 4,931,944 | 6/1990 | Richter et al. | 364/468 |
| 4,937,755 | 6/1990 | Yokota et al. | 364/488 |
| 4,942,527 | 7/1990 | Schumacher | 364/401 |
| 4,958,292 | 9/1990 | Kaneko et al. | 364/403 |
| 4,994,980 | 2/1991 | Lee et al. | 364/474.15 |
| 5,053,970 | 10/1991 | Kurihara et al. | 364/468 |

OTHER PUBLICATIONS

Assembly Line Balancing and the Application of Computer Techniques Norman A. Schofield, vol. 3; Comput. & Indus. Engng., p. 53; May 1979.

Lorenz et al, Production Handbook, 4th Edition, p. 176, Oct. 1982.

Bhattacharjee, vol. 7, No. 6 International Journal of Production Management 32; p. 32; see p. 35, Aug. 1986.

Primary Examiner—Jerry Smith
Assistant Examiner—Paul Gordon
Attorney, Agent, or Firm—L. Joy Griebenow; Richard Donaldson; William E. Hiller

[57] ABSTRACT

Assembly line balancer groups tasks of multi-sided, mixed model assembly lines on the basis of per side and per model constraints. Resulting compound tasks involve less computational time and power in balancing the line.

16 Claims, 12 Drawing Sheets

|     | TASK | IMMEDIATE PREDECESSOR (S) | TASK TIME |
|-----|------|---------------------------|-----------|
| T1  | SHORTS | NONE | 17 |
| T2  | UNDER SHIRT | NONE | 19 |
| T3  | LEFT SOCK | NONE | 22 |
| T4  | RIGHT SOCK | NONE | 22 |
| T5  | TROUSERS | T1 | 21 |
| T6  | SHIRT | T2 | 38 |
| T7  | BELT | T5, T6 | 12 |
| T8  | TIE | T6 | 38 |
| T9  | LEFT SHOE | T3, T5 | 19 |
| T10 | RIGHT SHOE | T4, T5 | 19 |
| T11 | COAT | T6 | 41 |
| T12 | HAT | T2 | 12 |

*Fig. 1a*

| | DATA | | BALANCE | | | DIAGRAMS | | | GRAPHS | | |
|---|---|---|---|---|---|---|---|---|---|---|---|
| | | | MODEL-W | EDIT TASK INFORMATION | | | | | | | |
| TASKS | TASK TIME | PRECEDENCE | WITH | NOT WITH | ALONE? | MAX PARALL | AUTOMATED | SIDE | MODEL | S. BEFORE | S. WITH | S. N/WITH |
| T110 | 5 | NONE | T120 | T130 | | 1 | | RIGHT | B | | T101 | |
| T101 | 4 | NONE | | T103 | | 1 | | LEFT | B | | T110 | |
| T1 | 7 | NONE | | T3 | | 1 | | LEFT | A | | | |
| T10 | 5 | NONE | T20 | T30 | | 1 | | RIGHT | A | | | T3 |
| T130 | 10 | T110 | | T110 | | 1 | | RIGHT | B | | | |
| T3 | 10 | T1 | | T1T2 | | 1 | | LEFT | A | | | T20 |
| T103 | 14 | T101 | | T101 | | 1 | | LEFT | B | | T30 | |
| T30 | 12 | T10 | | T10 | | 1 | | RIGHT | A | | T3 | |
| T2 | 6 | T1 | | T3 | | 1 | | LEFT | A | | | |
| T120 | 7 | T110 | T110 | T130 | | 1 | | RIGHT | B | | | T3 |
| T102 | 6 | T101 | | T103 | | 1 | | LEFT | B | | | |
| T20 | 6 | T10 | T10 | T30 | | 1 | | RIGHT | A | | | |
| T140 | 10 | T130 | | | | 1 | | RIGHT | B | | | |
| T40 | 10 | T30 | | | | 1 | | RIGHT | A | | | |
| T104 | 12 | T103 | | | | 1 | | LEFT | B | | | |
| T4 | 13 | T3 T2 | | | | 1 | | LEFT | A | | | |

| | | | BALANCE MODEL-W | | EDIT TASK INFORMATION | | | | DIAGRAMS | | GRAPHS | |
|---|---|---|---|---|---|---|---|---|---|---|---|---|
| TASKS | MAX PARALL | AUTOMATED | SIDE | MODEL | S. BEFORE | S. WITH | S. N/WITH | S. ONLY? | M. WITH | M. N/WITH | M. ONLY? | NOTES |
| T110 | 1 | | RIGHT | B | | T101 | | | T10 | T30 T3 | | |
| T101 | 1 | | LEFT | B | | T110 | | | T10 | T30 T3 | | |
| T1 | 1 | | LEFT | A | | | | | | T130 | | |
| T10 | 1 | | RIGHT | A | | | T3 | | T110 | T130 | | |
| T130 | 1 | | RIGHT | B | | | | | T30 | | | |
| T3 | 1 | | LEFT | A | | T3 | T20 | | T130 | T120 | | |
| T103 | 1 | | LEFT | B | | T30 | | | | | | |
| T30 | 1 | | RIGHT | A | | | | | T130 | T130 | | |
| T2 | 1 | | LEFT | A | | | T3 | | | T30 T3 | | |
| T120 | 1 | | RIGHT | B | | | | | | T30 T3 | | |
| T102 | 1 | | LEFT | B | | | | | T130 | T130 | | |
| T20 | 1 | | RIGHT | A | | | | | | | | |
| T140 | 1 | | RIGHT | B | | | | | | | | |
| T40 | 1 | | RIGHT | A | | | | | | | | |
| T104 | 1 | | LEFT | B | | | | | T4 | | | |
| T4 | 1 | | LEFT | A | | | | | T104 | | | |

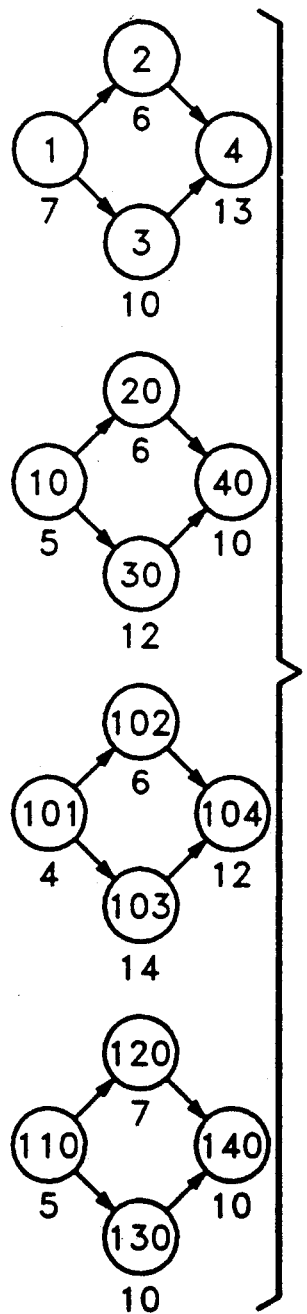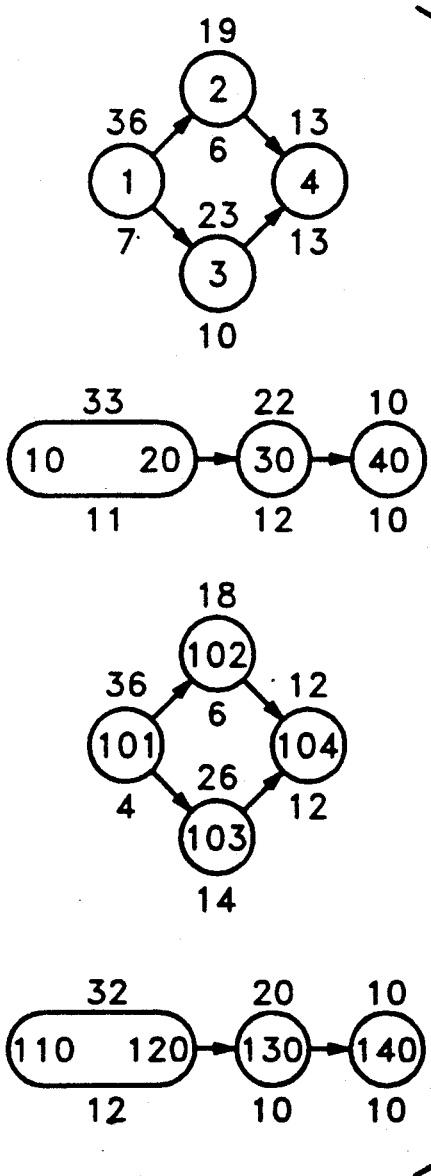
Fig. 3a
Fig. 3b

ASSEMBLY LINE BALANCER

This application is a continuation of application Ser. No. 07/444,646, filed Dec. 1, 1989, now abandoned.

BACKGROUND OF THE INVENTION

1. Field of the Invention

This invention relates to serial manufacturing operation, and more specifically relates to a method of balancing a serial assembly line.

2. Description of the Related Art

Certain types of manufacturing operations are normally organized into what are commonly referred to as assembly lines, manufacturing lines, or production lines. In this discussion, they will be referred to as assembly lines. Assembly lines operate as follows: Materials and parts that go into the final product are introduced to the line. Various manufacturing operations, inspections, tests, and/or handling operations are performed at workstations along the line in a serial manner. The result of these steps is the emergence of the final product at the end of the line.

A classic example of a progressive assembly line is that of an automobile assembly line. In this example the chassis, for instance, of the automobile to be assembled is conveyed along the line, passing the various operators at their workstations as it moves along. As the chassis passes a given workstation, the operator performs his given task, which may be, for example, to attach a fender to the chassis. This task is repeated for each chassis which is conveyed past the operator. Note that the operator performs only this task, and performs it on every chassis that goes past him. In modern assembly plants, the operator may be an automated machine or robot which performs the task on a repetitive basis. The line is designed such that the chassis is conveyed past the operator at such a speed that the operator has adequate time to perform his task properly. Equally important is the criterion that the chassis not be conveyed so slowly that the operator has excessive periods of idle time between operations.

Several terms must be defined in the context of this discussion. Although these terms have general meanings, their definition is more narrowly construed as presented herein. In this discussion the term task is defined as a minimum rational work element, i.e. an indivisible element of work, or a natural work element. A task may actually consist of several distinct actions, however further dividing the actions would cause unnecessary work in the form of extra handling. As an example, attaching a fender to an auto chassis could involve the actions of positioning the fender, fetching retaining bolts from a storage bin, placing the retaining bolts in the appropriate holes, fetching a tool to drive the bolts home, and finally driving the bolts home. Although this task as described consists of several distinct actions, to divide the task between operators would involve a great deal of unnecessary coordination between the two, and probable repetition of effort, hence the actions are grouped as an indivisible task. Task time is defined as the amount of time it takes to complete the task.

A workstation is a physical location at which a process, operation, test or inspection is performed or carried out on the in-process product. The workstation may be the location of a specific machine, a group of machines, or an operator and a machine. One task, or a plurality of tasks can be performed at a workstation. Generally each workstation requires one operator. However, in some cases, a single operator can operate several workstations, if time and physical constraints allow it. Conversely, in some cases (such as heavy machinery manufacture or aircraft assembly lines) several operators may be required to man a single workstation.

Another important term is the assembly line cycle time. The cycle time is a function of the line speed, and is the elapsed time between successive units moving along the assembly line. Another way of expressing this is that the cycle time is the amount of time the product is available at each workstation.

Delay time is a concept which is the result of uneven distribution of task times for the various workstations. To illustrate, consider a hypothetical assembly line consisting of four workstations, specified as W1, W2, W3, and W4, at each of which one task is performed, specified as T1, T2, T3, and T4 respectively. The cycle time for this line is ten seconds, meaning the product is available for processing at each station for ten seconds. Assume it takes ten seconds to perform T1, four seconds to perform T2, seven seconds to perform T3, and ten seconds to perform T4. The total time for a product to complete the assembly line is forty seconds (four stations times a ten second cycle time). The total of the actual task times, however, is thirty-one seconds. In this case, the delay time, is the difference between the total time for the product to complete the assembly line, and the total time required for the actual processing of the product while on the assembly line.

Delay time is often expressed as a percentage, and expressed as balance delay. To do so, the sum of the task times (thirty-one seconds) is subtracted from the total available line time (forty seconds); the result is divided by the total available line time, and multiplied by 100. In this case the balance delay time equals 22.5 percent. In other words, during 22.5 percent of the time that the product is moving along the assembly line, the operator(s) are idle and non-productive. If each task time was ten seconds, and the cycle time remained ten seconds, then the balance delay would be zero, meaning each operator is operating at full capacity, with no idle time. This is, of course, an ideal case, which is seldom achieved in actual practice.

If the above example were modified slightly by changing the task time of task 3 (T3) to six seconds, from seven seconds, an example of assembly line balancing can be demonstrated. In this new instance, the total task time is thirty seconds, the total line time is unchanged at forty seconds, and the balance delay is equal to twenty-five percent. However, note that T2 and T3 can be grouped together at one workstation, without violating the need to stay below the cycle time. Now, there are three workstations, specified as W1, W2, and W4. T1 is still assigned to W1 and the total task time for W1 is ten seconds (as before). T4 is still assigned to W4, with a total task time for W4 of ten seconds. W2 now contains tasks T2 and T3, with a total task time of ten seconds for the workstation. In this case the balance delay has been reduced to zero, from twenty-five percent, by combining two tasks to one workstation. Note that as originally expressed, this assembly line could not have been optimized in this way. In the first situation combining T2 and T3 would have resulted in a workstation with a cumulative task time of eleven seconds, which would have violated the cycle time available. In real terms, this means the operator of workstation W2 would have had ten seconds in which to accomplish eleven seconds worth of tasks, which is not possible. However, when T2's and T3's cumulative task time is below the cycle time, combining the tasks results in one less operator/workstation required, and in less idle time.

In a very simplified way, the above discussion provides the motivation and the methodology for assembly line balancing. As shown, the goal of assembly line balancing is to optimize the performance and production of an assembly line. This is done by 'balancing' the various workstations such that: 1) each workstation has that number of tasks which leads to a minimum of idle time due to an imbalance of the total task times among the various workstations; and 2) the variation in cumulative task times due to the distribution of the tasks among the workstations is minimized. As shown, assembly line balancing can result in the need for fewer operators or workstations without a decrease in the production rate. Alternatively, assembly line balancing can be used to derive a shorter cycle time (and hence an increased production rate) without adding operators or workstations. Often a combination of shorter cycle time and reduced workstations is the desired goal.

Assembly line balancing is often explained in terms of a packing analogy, that is the balancing problem is analogous to that of packing a given number of equally sized boxes with blocks of varying sizes. The boxes represent the set of workstation cycle times, and the blocks of varying sizes represent the varying task times of the assembly line. The goal is to pack the boxes as fully as possible with the blocks so as to minimize the empty space left over (which corresponds to idle time).

Some blocks have restrictions on what box they can go into, and where in the box they must go (precedence constraints). However, most blocks can be placed wherever they will fit most efficiently. The are three factors which can impact the degree of difficulty experienced and the degree of optimization which can be achieved. These are: 1) the distribution of the sizes of the blocks; that is the ratio of large blocks to small blocks, and how large the large blocks are. Generally, the more large blocks there are, the more difficult the packing problem becomes. 2) The size of the blocks compared to the size of the boxes. Relatively small blocks would be easier to pack than blocks which are large, relative to the size of the box. There is a restriction, however, that no block can be larger than a box. 3) The number of blocks which have some restriction as to where they can be placed. Naturally, the more blocks which have such restrictions, the more difficult the packing problem becomes.

The best solution to such a problem is to start with the restricted blocks first by placing them where they must go. In this way, there is no worry about coming across them later when their required space may already be filled. Next, the larger blocks are placed in the boxes, before the available large spaces are inefficiently wasted by filling them with smaller boxes. Gradually, smaller and smaller blocks are dealt with as the larger blocks are placed, until finally the small gaps and voids left in the boxes can be filled in with the remaining small blocks. Visualizing the assembly line process in this physical manner aids in understanding the concepts and the rationale for the techniques employed.

THE PRECEDENCE DIAGRAM

The first step in balancing an assembly line is to create a precedence diagram. This is a schematic representation which describes the tasks and their chronological ordering. A wealth of information is provided by the precedence diagram. For illustrative purposes, an example is provided in FIG. 1(a) and FIG. 1(b), in which the 'assembly line' in this case is the process of getting dressed in the morning. FIG. 1(a) lists the tasks required for the complete process of getting dressed, a name for each task, the time duration, and the immediate predecessors, if any, for each task. The immediate predecessor of a task is that task which must be accomplished before the task in question can be accomplished, because of manufacturing, spatial or some other constraints (generally called precedence constraints).

FIG. 1(b) is the precedence diagram derived from the information in the table. Each task is represented as a circle on the diagram, with the associated task time below it, and the task name within it. The arrows of the diagram indicate precedence constraints. For example, task T9—put on left shoe, must be preceded by task T3—put on left sock. To attempt the process in the other order would be impossible. This precedence constraint is indicated by the arrow originating at T3 and terminating at T9. Similarly, putting on the under shirt (T2) must precede putting on the shirt (T6), and this task must precede putting on the coat (T11). These relations are represented by the arrows originating at T2 and terminating at T9, and originating at T9 and terminating at T11. Note that putting on the under shirt (T2) is a prerequisite task to putting on the coat (T11) and putting on the tie (T8) as well. However, it is unnecessary to add arrows between these tasks, since a path exists between the tasks through T6. To illustrate the precedence constraints between tasks T11 and T2 would be redundant in view of the already shown constraint between tasks T2 and T6 and tasks T6 and T11. In this way, the precedence diagram shows the relationship between the various tasks, as well as the precedence constraints imposed on the line by various factors, in a format that is logically and clearly laid out.

The precedence diagram provides some information as to the proper sequencing of the tasks, as addressed above. However, the precedence diagram format allows for a great number of variations in task sequencing for those tasks which do not have a specific predecessor. For example, in FIG. 1(b) there are four tasks—T1, T2, T3, and T4—which have no immediate predecessors, and hence, which can be taken in any order. In other words, the 'assembly line' shown in FIG. 1(b) could start with any one of the first four tasks, and then proceed on to any one of the other, or on to any other task which has no un-completed predecessors. To illustrate further, three possible orderings of tasks are presented which can be derived from the diagram without violating any of the precedence constraints. Firstly, the getting dressed 'assembly line' ordering could be begun in this manner: T1, T2, T3, T4, T5, T6, T7 . . . . Another possible ordering of the tasks could be: T3, T1, T4, T2, T5, T9, T6 . . . . Still another possible ordering of the tasks could be: T1, T5, T3, T9, T4, T2 . . . . Obviously, the variety of possible orderings which comply to the precedence ordering of the diagram is almost unlimited. So, although the precedence diagram is an excellent tool for diagramming the tasks and constraints of an assembly line in a clear format, other tools are required to come up with a best possible ordering of the tasks.

Furthermore, the above example is somewhat misleading in that the act of dressing in the morning is not what one would ordinarily consider as an assembly line. However, if the example is modified somewhat, for example, to an assembly line where children's dolls are dressed, in a mass production format, then the example falls more within the realm of assembly line techniques. It is also clear now, that if the dolls are being produced at the rate of one thousand per day, with only two or three minutes allowed to dress each doll, which is being done by workers making several dollars an hour, or perhaps by machines costing thousands of dollars each, the motivation to optimize each task of the process, and the interaction of the tasks is substantial.

The first step in the optimization process would be to create the precedence diagram in order to clearly define the process. The next steps are to order the tasks in the best possible sequence, and then to divide the tasks among the workstations in the most efficient manner. These generic concepts are covered by assembly line balancing.

LINE BALANCING

The earliest forms of line balancing were simple trial and error methods. A plausible assembly line was set-up, and the resulting productivity and operator idle times measured. Empirical data derived was used to modify the line for improved performance. This form of approach to the assembly line balancing problem, while in no means the most efficient is still one of the most commonly used and wide-spread techniques for many reasons. One reason is probably a lack of satisfaction with the existing automatic approaches which tend to deal with assembly line balancing in academic terms rather then in a real-world context.

Many researchers in the field have approached the assembly line balancing technique as a strictly mathematical problem which can be solved for an optimum solution, by accounting for all the variables and performing successive iterations. This approach is impractical due to the large number of variables, i.e. the number of tasks, workstation constraints, precedence constraints, etc. in a typical assembly line. Solving for an optimal solution in this way requires an unacceptable level of computational time, even with sophisticated computer tools. As such these types of techniques have been historically regulated to academic environments.

For real-world applications, heuristic methods were developed, which give near-optimal solutions with much less computation needed, compared with optimal solutions. One heuristic method which is widely accepted is the Ranked Positional Weight Technique (RPWT), developed by Helgeson and Birnie in 1961. The RPWT is a heuristic approach to derive a near optimal solution to the assembly line balancing problem by assigning tasks to workstations in order of the relative weight of each task. The relative weight is determined by taking the task time for the task at hand and adding to it the task times of all the tasks which follow that task on the precedence diagram, i.e. all tasks that are dependent upon the task at hand being completed before they can be performed. The dependent tasks are identified on the precedence diagram by having an arrow terminating at them which originates from the task at hand. For example, in the line illustrated in FIG. 1(b) the task time of T9 is nineteen seconds. Task times are illustrated below the task symbol. No tasks are dependent upon the completion of T9 in order to be performed, hence the positional weight is equal to the task time of T9 or nineteen. Weights are illustrated above the task symbol. Note that no arrows originate from T9. The positional weight of T3, however is equal to the task time of T3 plus the task time of T9, or forty-one. The positional weight of T5 is equal to the task time of T5 plus the three tasks which T5 has arrows terminating at, namely T9, T7, T1. In this case the positional weight of T5 is (21+19+12+19) seventy-one.

The positional weight assigned each tasks will be used to determine the order in which the tasks are selected for assigment to the workstations. It seems, therefore, intuitively correct that a tasks which has several tasks dependent upon it in precedence will be given a higher weight value, then a task which has few dependent tasks. Of course, the cumulative task times of the dependent tasks are what is weighted, not simply the number of dependent tasks which follow. The positional weights of the twelve tasks of FIG. 1(b) are listed below, in order of their Ranked Positional Weight:

T2 ... 169
T6 ... 138
T1 ... 88
T5 ... 71
T8 ... 47
T3 ... 41
T4 ... 41
T11 ... 41
T9 ... 19
T10 ... 19
T7 ... 12
T12 ... 12.

Note that tasks T3, T4 and T11, T9 and T1, and T7 and T12, having the same ranked positional weight can be listed in any relative order. Having derived the ranked positional weights of the tasks, the next step is to combine the tasks into workstations in the most efficient manner. To do so, further input is required as to the maximum number of workstations it is feasible or desirable to use, or as to the maximum cycle time which is feasible or desirable. The extremes of possible cycle times will fall between as a, maximum, the sum of the task times of the entire assembly, which would correspond to all the tasks being performed at one station by one operator, and a minimum cycle time equal to forty-seven seconds. This latter constraint is dictated by the task time of T8, which is forty-seven seconds. Therefore, the cycle time must be at least long enough to allow ample time for the longest task to be completed by an operator. For the current example, it will be assumed that due to the demand on production rates, there is a maximum cycle time constraint of 120 seconds.

Utilizing the Ranked Positional Weight Technique, the next step would be to 'pack' the workstations with the tasks in order of their positional weights. This is performed by starting with the task with the highest positional weight and assigning it to the first workstation. Then the task with the next highest positional weight is included in the first workstation, providing the cumulative task time of the included tasks do not violate the cycle time.

In the current example, T2, with a weight of 169 and a task time of nineteen seconds, would be selected fist. The task with the next greatest weight (from the list above) is T6, with a task time of thirty-eight seconds. The cumulative task time is fifty-seven seconds, which is less than the cycle time. The next task to be considered is T1, with a task time of seventeen seconds, which will bring the cumulative task time to seventy-four seconds, which is still less than the cycle time. The next task to be considered is T5, with a task time of twentyone seconds, resulting in a cumulative task time of one ninety-five seconds. As the cycle time is 120 seconds, it is possible to add more tasks to the workstation. However, the next task on the ranked list, T8, has a task time of forty-seven seconds, which if added to the workstation would exceed the cycle time. Therefore, T8 cannot be added to the workstation. However, there may be other tasks which can be assigned to workstation 1.

Since T8 will not be performed in workstation W1, no task can be assigned to W1 which has T8 as its immediate predecessor. In fact, no task can be assigned unless all of its required predecessors have already been assigned. Continuing on, T3 would be the next task considered. Note from the precedence diagram that T3 has no predecessors, and is therefore eligible for assignment. Therefore, T3 is assigned to W1, bringing the cumulative task time to 117 seconds. As the cycle time is 120 second, only a three second task could be assigned to W1 to fill it, of which there are none. Therefore, a second workstation is needed.

Tasks are assigned to workstation W2 in the same manner, starting with the task with the largest ranked weight, which has not been assigned, namely T8. T4 is assigned next, bringing the cumulative task time to sixty-nine seconds. The next task in order is T11, which will bring the cumulative time to 110 seconds. None of the other tasks can be assigned to W2 without exceeding the cycle time.

W3 is assigned tasks in the same manner as the proceeding two work-stations, starting with T9, and completing the process by assigning T1, T7 and T12. The results are provided in a tabular form below:

| STATION | CUMULATIVE TASK TIME | IDLE TIME |
|---|---|---|
| W1 ... T2,T6,T1,T5,T3 | 117 | 3 |
| W2 ... T8,T11 | 110 | 1 |
| W3 ... T9,T1,T7,T12 | 62 | 62 |

The balance delay for this assembly line can now be derived by taking the difference between the total assembly line time (360 seconds) and the sum of the cumulative task time (289 seconds) and dividing the result by the total assembly line time. The resulting balance delay is nineteen percent, which means that the operators on this line will be non-productive or idle nineteen percent of the time. This balance delay is caused by the uneven distribution of the task times among the workstations. An ideal case of zero balance delay can be achieved when all of the cumulative task times of the workstations are equal. In this ideal situation, the cycle time could be set to this cumulative task time and no idle time would result. Such ideal conditions can seldom be achieved in real solutions, however.

It may be possible to improve assembly line performance by selecting a different cycle time. It is useful to perform the balance technique again to demonstrate how cycle time can impact balance delay as well as the number of workstations required. For instance, if the example assembly line were re-balanced with a required maximum cycle time of eighty seconds, the results would be as follows.

W1 could only have tasks T2, T6, and T1 assigned to it, for a cumulative task time of seventy-four seconds. W2 would have T5 and T8 assigned to it resulting in a cumulative task time of sixty-eight seconds. Note that T7 can also be assigned to W2 because this will not violate the cycle time constraint, and also because the immediate predecessors (T6 and T5) have already been assigned. W3 will be assigned T3, and T4, but T11 will not be assigned because of the cycle time constraint. However, T9 and T12 can be assigned without violating either the cycle time or the precedence constraints. Lastly W4 will have T11 and T1 assigned to it. The results are shown below.

| STATION | CUMULATIVE TASK TIME | IDLE TIME |
|---|---|---|
| W1 ... T2,T6,T1 | 74 | 6 |
| W2 ... T5,T7,T8 | 80 | 0 |
| W3 ... T3,T4,T9,T12 | 75 | 15 |
| W4 ... T11,T1 | 60 | 20 |

The resulting balance delay for the line is now less then ten percent. Note however, that four workstations are now required instead of the previous three. Idle time is decreased, and with a lower cycle time, the overall production rate can be increased. The tradeoff is that now four operators must be hired, or four workstations must be maintained. The benefits/costs of these factors must be considered and evaluated by the line designers. The purpose of assembly line balancing is to provide a method for deriving the most efficient division of tasks for the criteria.

Although useful for demonstration and explanation, the above example is obviously trivial. Real world assembly lines may entail hundreds of tasks divided amongst scores of workstations. Perhaps more importantly, real world constraints upon machinery, personnel, physical space, etc. can seriously affect the complexity of the balancing process.

In an automotive assembly line, a spray painting operation would provide a good example of such real-world constraints. Often the painting operation must be performed away from other tasks to avoid interference, or overspray marring other components. Therefore, although it may be advantageous from a balancing perspective to combine the painting task with several other tasks in a single workstation, this may not be practical. Therefore, there must be a way to constrain the line balancer to keep this task separate, regardless of how it impacts balance delay.

Other constraints must be taken into account. For instance, modern assembly lines are designed for flexibility. It is not uncommon for two or several different models of a product to be produced simultaneously on a given line. An example would be an automobile assembly line which produces four door as well as two door models of a given automobile. Even a given model, such as the two door will have several options which will vary from automobile to automobile. Typically, several different models will be on a given line at any one time. To balance the line for only one model will result in unacceptable balance delays and inefficiency. To re-balance the line each time a different model is started would be completely impractical. Therefore, an assembly line balancing technique must be able to account for multiple models on a single assembly line.

Another real world requirement that must be met is that of a multisided product. Continuing with the automobile example, it is clear that the steps or tasks required to complete the driver's side of an automobile are different from the tasks required for the passenger's side. The steering wheel, brake and accelerator pedals, and other tasks are side specific. Again, balancing for only a one-sided product will result in gross inefficiency in a real world line.

Therefore, in order to meet the demands of the application, an assembly line balancing technique must 1) provide a near-optimum solution 2) do so without excessive computation time and 3) have the capacity to adjust the outcome for real-world constraints such as the ones listed above. Known practical assembly line balance techniques have problems, including: the inability to handle multi-sided, mixed model product assembly lines, and non-user friendly input formats.

SUMMARY OF THE INVENTION

The present invention provides a near-optimal assembly line balance for a mixed model, multi-sided product. Line information is input in a user-friendly format, and output data can be graphically depicted in a variety of user-chosen format.

BRIEF DESCRIPTION OF THE DRAWINGS

FIGS. 1a–b illustrate the data for and precedence diagram of a simple assembly line.

FIGS. 2A and 2B illustrate a typical line balance input format.

FIGS. 3a–e illustrate the progressive steps of modelling an assembly line for balancing.

DESCRIPTION OF THE PREFERRED EMBODIMENTS

Figure 1B:
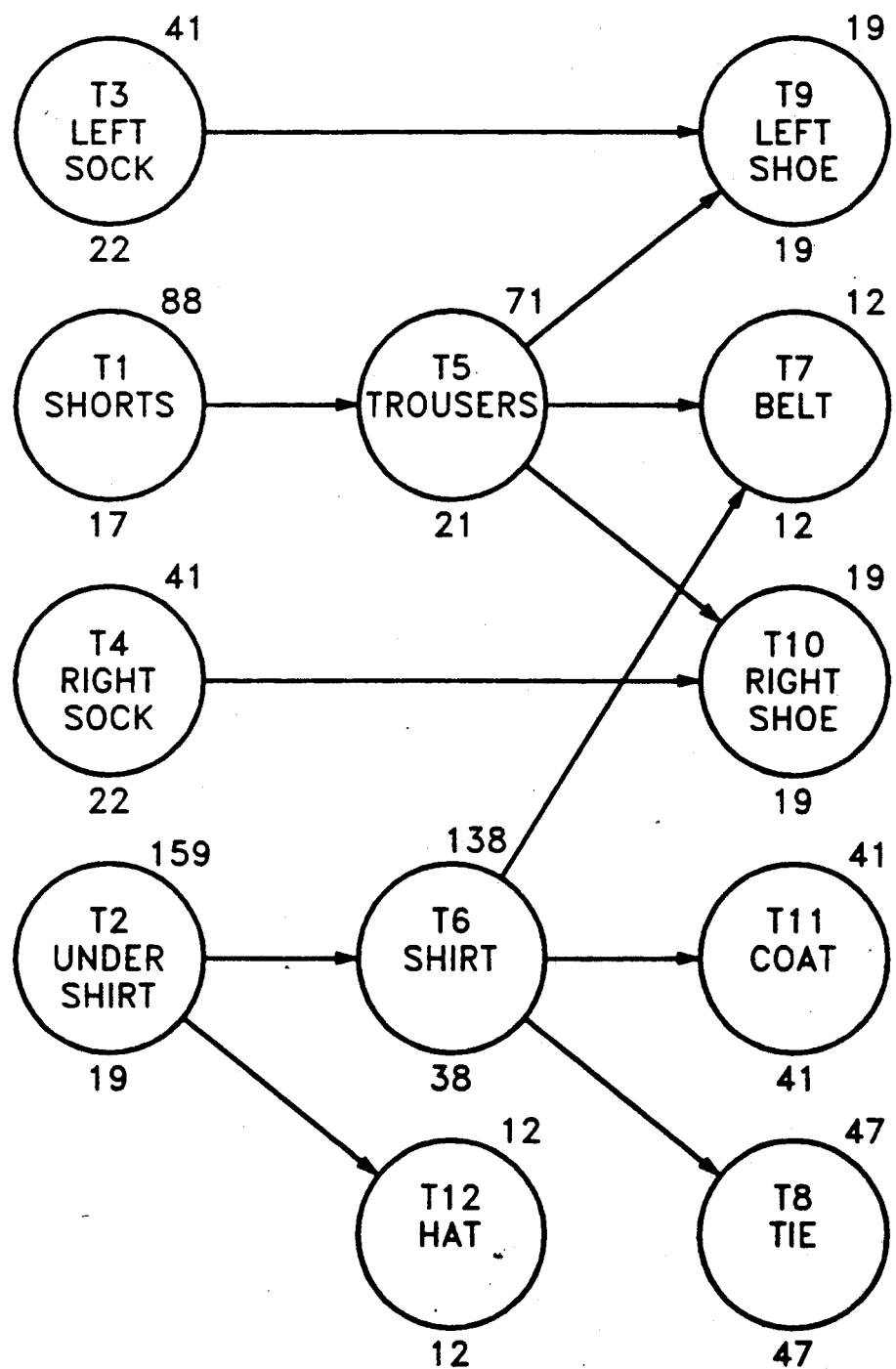

The first preferred embodiment method balances multi-sided, mixed model assembly lines with several types of constraints imposed upon the grouping of tasks among the workstations. In a multi-sided assembly line the product can have tasks performed upon it from one of many sides (front and back, left and right, top and bottom, etc.). Some tasks may be common to both sides, but this is not required. A mixed model assembly line may have several different models of a product being assembled on the line concurrently. The goal of assembly line balancing in such a case is to balance the line efficiently regardless of the model mix, i.e. regardless of the relative numbers of each model type being assembled. The types of constraints imposed upon the grouping of tasks is considered in detail below.

A precedence diagram defines only one type of constraint, that is chronological precedence of tasks. Many other types of constraints must be defined, however, in order to accurately model the assembly line for balancing. For instance, physical placement of certain machines may require that tasks involving those machines be performed together. Likewise, concerns for operator safety may prescribe that certain tasks not be performed at the same workstation, for instance separating operator assisted tasks from tasks which present a great hazard for line workers. Some tasks are of such a nature that it is most efficient to allow no other tasks at the same workstation. A spray painting step was previously given as an example of such a task. Further, an adaptable, flexible modern assembly line on which tasks can proceed on several sides of the product in unison, and on which several models of the product can be produced simultaneously, requires that even further restraints be taken into account.

For a one-sided product on a single model assembly line, four types of constraints apply: ALONE specifies a task which cannot be combined with any other task at a station. If a task is considered particularly dangerous, or critical, it may be constrained as an ALONE task. On the other hand, a task which must be performed with a specified other task or tasks (at the same workstation) has a WITH constraint associated to it and with those tasks with which it must be grouped. Some tasks are not required to be performed ALONE, but nonetheless have constraints imposed on them such that they will not be performed with specified other tasks. This type of constraint is termed NOT WITH. As an example, a line designer might want to assure that a heavy vibration producing task is constrained to be NOT WITH a delicate precision requiring task. Note that the ALONE constraint is an extreme case in which one task has been constrained NOT WITH all other tasks on the line.

A more complex assembly line involves a multi-sided product in which tasks are grouped not only by the constraints described above, but also in relation to what side of the product they are to be performed. For instance, if it is desired that a certain first task is performed on the left side of the product before a certain second task is performed on the right side of the product, a SIDE BEFORE constraint is attached to the left side task. This task will constrain the line such that the right side task cannot be performed until left side task has been performed. Note that this constraint does not specify whether the two tasks need be performed at different stations, merely that they be performed in the prescribed order. In essence this is a precedence constraint between tasks on different sides of the product. However, if SIDE BEFORE and SIDE NOT WITH constraints are combined, the tasks will be performed at a previous workstation.

A SIDE ONLY constraint specifies that no tasks from other sides can be performed at the same workstation as the task with the SIDE ONLY constraint. This case is less constrained then the ALONE task which can have no other tasks occur at the same workstation. In the SIDE ONLY case, tasks can be performed on the same side as the constrained task. Only tasks on other sides of the product are precluded. Such a constraint may be prudent when a task involves drilling completely through the product; although the task may not be dangerous to other workers on the same side as the driller, it could be hazardous to workers on the opposite side.

SIDE WITH constrains the line such that tasks from different sides must be performed at the same workstation. For instance, it may be most efficient to have the tires of both sides of an automobile mounted at the same workstation. Conversely, SIDE NOT WITH constrains that certain tasks from different sides cannot be performed at the same workstation. This does not mean that no tasks can be performed at a different side at the workstation. Only those tasks listed in the SIDE NOT WITH constraint are excluded.

Further grouping constraints are required when more than one model of a product are run simultaneously on the line. For instance, MODEL WITH specifies that the listed tasks must be done at the same station for all models. For instance, if one of the tasks for assembly is a fastening operation, it may be most efficient to specify that the fastening tasks for all models be done at the same station. In this way one fastening machine can perform the required operation for all the models without having to be moved to different stations depending on the model currently being assembled.

MODEL ONLY specifies that no other model can be performed at the same station as the constrained task. In this way a certain workstation with unique characteristics may be reserved only for the model which requires those characteristics.

MODEL NOT WITH, like SIDE NOT WITH, and NOT WITH, specifies certain tasks which cannot be performed at the same workstation as the constrained task. In the case of MODEL NOT WITH, however, tasks are excluded by model. This means tasks from some models will be allowed, while tasks from certain other models will be excluded.

The above defined characteristics of task grouping and constraints are resolved into an accurate model of the assembly line as follows: Grouping constraints can be divided into three categories: Task constraints, side constraints, and model constraints. The names suggest the purpose of the constraining function of each group. Task constraints are used to define constraints of the tasks on a single side within a single model group. Side constraints are used to define constraints between tasks of different sides of a single model group. Model constraints are used to define constraints between tasks of different models of the product. The interactions of these various types of constraints can be best illustrated by working through an example of balancing a simple multi-sided, mixed model assembly line.

FIG. 2 is an example of the format used in a preferred embodiment to input the various information required about the assembly line tasks and task constraints. The example shown is for a two-sided product run on an assembly line on which there is a mix of two model types. The spreadsheet format allows for ease of inputting the data, as well as a convenient method for displaying and organizing the data. Each row represents one task. The first column contains a task name for each task. The second column contains the task time. The third column specifies any immediate predecessors of the task, i.e. any tasks which have an immediate chronological precedence. The fourth through sixth columns list any of the task constraints. Similarly columns eleven through thirteen list any side constraints for the task, and columns fourteen through fifteen list any model constraints. Columns eight signifies whether the particular is an automated task. Column seven is discussed in detail later. Column nine denotes on which side of the product the task is to be performed, and column ten denotes to which model the task applies.

As an example, task T110 (row one) has a task time of five seconds (column two). T110 is to be performed on the right side (column nine) of model B (column ten). The task has no immediate predecessors (column three), and must be grouped WITH T120 (column four), but must be grouped NOT WITH task T130. Further constraints are that T110 must be performed on the right side of the product at the same workstation in which T101 is performed on the left side of the product (column twelve), or SIDE WITH T101. There are also model constraints associated with T110 such that T10 of model A must be performed at the same workstation (column fifteen)—MODEL WITH—and T30 and T3 of model A must not be performed at the same workstation—MODEL NOT WITH.

A precedence diagram can be derived from the information provided in columns one, two, and three. The results are shown in FIG. 3(a). Each task is represented by a circle with its task name within the circle. The task time is shown below each task. Precedence constraints are shown by the arrows. For instance, T10 has no predecessors, so it is placed on the extreme left of the diagram. T20 and T30 have T10 as a predecessor, so they are placed to the right of T10, with arrows originating at T10 and terminating at T20 and T30. Lastly T40 has T20 and T30 as predecessors, so it is placed to the right of them and with arrows originating at them and terminating at T40. We are now faced, in FIG. 3(a) with four distinct partially ordered sets, corresponding to the Left side of Model A, the Right side of Model A, the Left side of Model B, and the Right side of Model B. However, the constraints which are imposed between the sides of the product, or between tasks performed on different models of the product are not shown in the diagram. Additionally, although the RPWT heuristic can prioritize the assignment (to workstations) of tasks for each individual side it gives no indication as to how to prioritize tasks between sides or models.

In the preferred embodiment, the constraints between tasks on different sides and different models will be modeled into the precedence diagram. Additionally, the assignment of tasks to workstations will be prioritized in light of these constraints. Additionally, the computational requirements for balancing the line will be greatly reduced by combing those tasks which have a WITH, SIDE WITH, or MODEL WITH constraint, into compound tasks and treating these compound tasks as model groups. In this way the number of distinct entities which must be tracked and evaluated during the assembly line balancing process is greatly reduced, leading to faster resolution of the problem, with less computational effort. This is accomplished as per steps A-F as follows:

A.

Figure 3C:
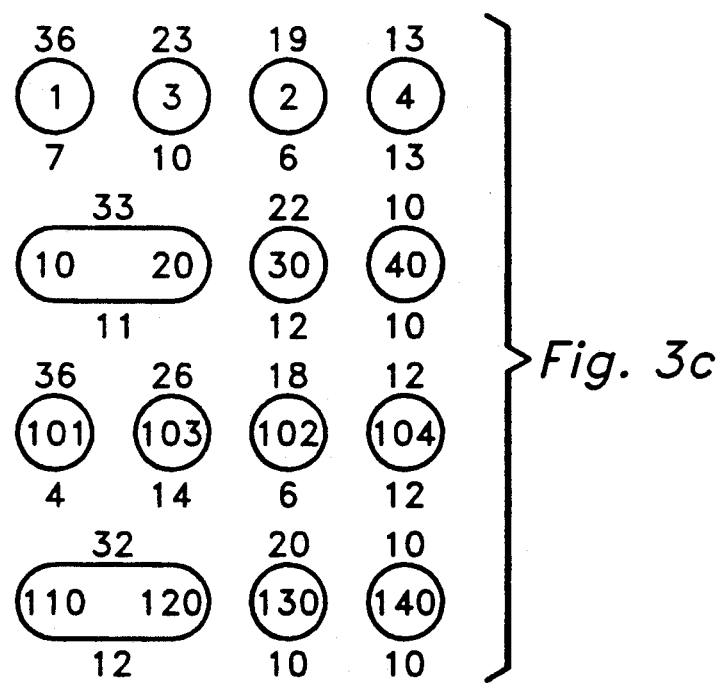

The information from column two of FIG. 2 is modeled into the diagram by combining those tasks which are WITH constrained together into a compound task. Theoretically this means the two (or more) tasks are combined into one large task. The tasks are still distinct operations on the line, but for balancing purposes, they will be treated as a single task. For this reason, the compound task will have a task time equal to the sum of the task times of the WITH constrained tasks which are included. The precedence diagrams are re-drawn in FIG. 3(b) with the WITH constrained tasks modeled by combining them in a single symbol. For instance, T110 and T120 are WITH constrained together, as are T10 and T20. This simplifies the precedence diagram by removing the ambiguity as to which task—T120 or T130—should be giving higher priority when assigning the tasks to workstations. There is still ambiguity between tasks T102 and T103, however, as well as T2 and T3, i.e. the sets are only partially ordered. This is resolved by applying the RPWT heuristic to the diagram. The positional weights of the tasks are shown above each task symbol in FIG. 3(b). For instance, T4 with a task time of thirteen seconds has a weight of thirteen. T2's weight is equal to T4's weight plus T2's task time, or nineteen. Similarly, T3's weight is equal to T4's weight plus T3's task time, or twenty-three. T1 has a weight equal to it's own task time plus the times of all the tasks which follow, or thirty-six. Therefore, these tasks prioritized for assignment to workstations in order of their weights would be assigned in the order of T1, T3, T2, T4. A similar analysis is performed on the other sets of tasks. For convenience and ease of visualization, the precedent diagram can be re-drawn with the tasks linearly ordered, i.e. placed from left to right in descending order, and with the WITH tasks drawn as a single compound task, as shown in FIG. 3(c). The precedence arrows have been left out of the draw to show that the tasks are ordered from left to right by their ranked positional weight and not necessarily by precedence.

B.

Figure 3D:
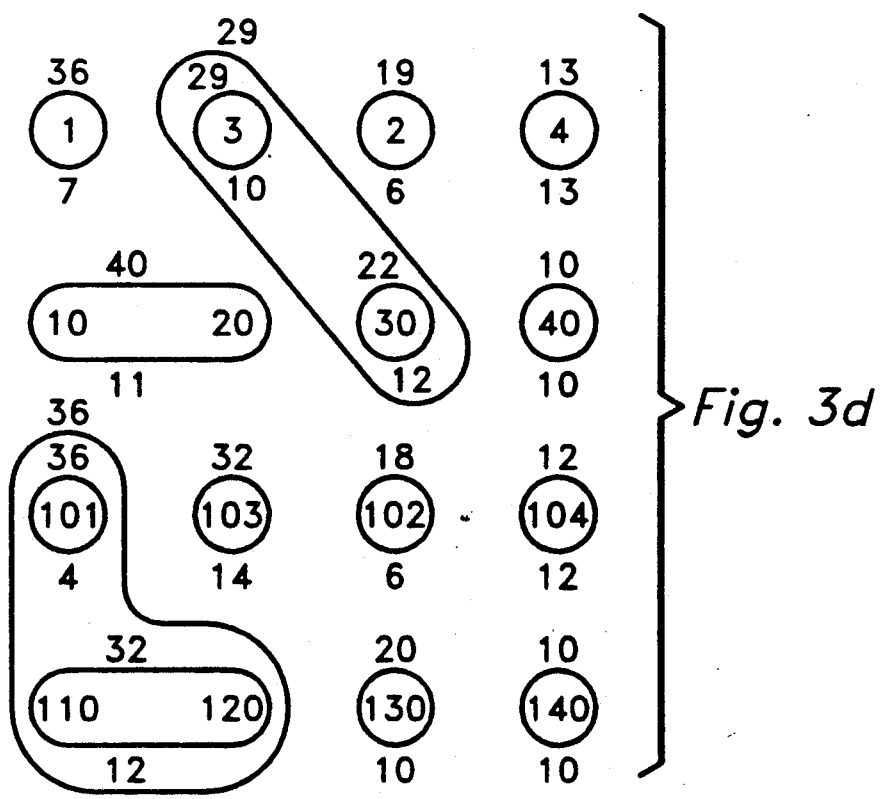

SIDE WITH constraints are next modeled into the diagram. In FIG. 3(d) the SIDE WITH constraints which are listed in Column twelve of FIG. 2 are shown by encompassing the component tasks (or task groups) with a bold line. SIDE WITH constraints can be between tasks, compound tasks, or both.

C.

The SIDE WITH tasks are grouped together into a compound task, much like the WITH tasks were grouped to form a compound task, however, the SIDE WITH group must be treated differently. Tasks which have a WITH constraint are performed serially on the same side of the product at the same workstation. In comparison, SIDE WITH tasks can be performed in parallel because they are performed on different sides of the product. Therefore, the task times do not add up for the SIDE WITH groups. In fact, the task times for the tasks which make up a SIDE WITH group must be kept track of, for reason which will be apparent when the tasks are assigned to the workstations. The purpose behind grouping the SIDE WITH tasks together is so that they will be considered for assignment to the workstations together. Since all the tasks must be grouped together, it follows that the ranked positional weight of these tasks ought to reflect this. For example, in FIG. 3(d) tasks T3 and T30 are SIDE WITH grouped together, per column twelve of FIG. 2. Recall that in FIG. 3(c) T3 had a weight of twenty-three and T30 had a weight of twenty-two. Since by the definition of SIDE WITH grouping, T3 must be assigned to the same workstation as T30, this is the same as saying that all tasks which must be proceeded by T30 must also be proceeded by T3. This is reflected by giving all the tasks within the SIDE WITH group the same weight as that of the task with the greatest weight in the group. Therefore, after the SIDE WITH tasks are grouped together, the RPWT heuristic is run again, however the SIDE WITH groups require special treatment. Beginning the heuristic with the top row in FIG. 3(d) T4 is given a weight of thirteen, as before, T2 is given a weight of nineteen (T4 task time plus T2 task time) and T3 has its task time added to that of T2 to get a weight of twenty-nine. Similarly, on the second row, T40 has a weight of ten and T30 has a weight of twenty-two. As stated above, however, in order to give the tasks within a SIDE WITH group the same priority, we wish to have all tasks within the group have the same weight. To assure most efficient packing, this weight is the maximum weight of a task within the group, which in this example is T3, twenty-nine. Therefore, processing continues in the first row with T3 having a weight of twenty-nine, but additionally processing continues in the second row with T30 also treated as having a weight of twenty-nine (as denoted by the weight of twenty-nine above the SIDE WITH group). The result of this is that the weight of T10/20 is equal to forty (task time of eleven plus new weight of twenty-nine for T30) rather then the thirty-three it was previously. This reflects the added 'baggage' that T30 now has associated with it by its grouping with T3. The same holds true for the SIDE WITH group of T101 and T110/120. In this case these tasks are leftmost and so no other tasks are impacted by the grouping. However, it still holds true that the weight for T110/120 will be treated as thirty-six as shown above the SIDE WITH group.

D.

Figure 3E:
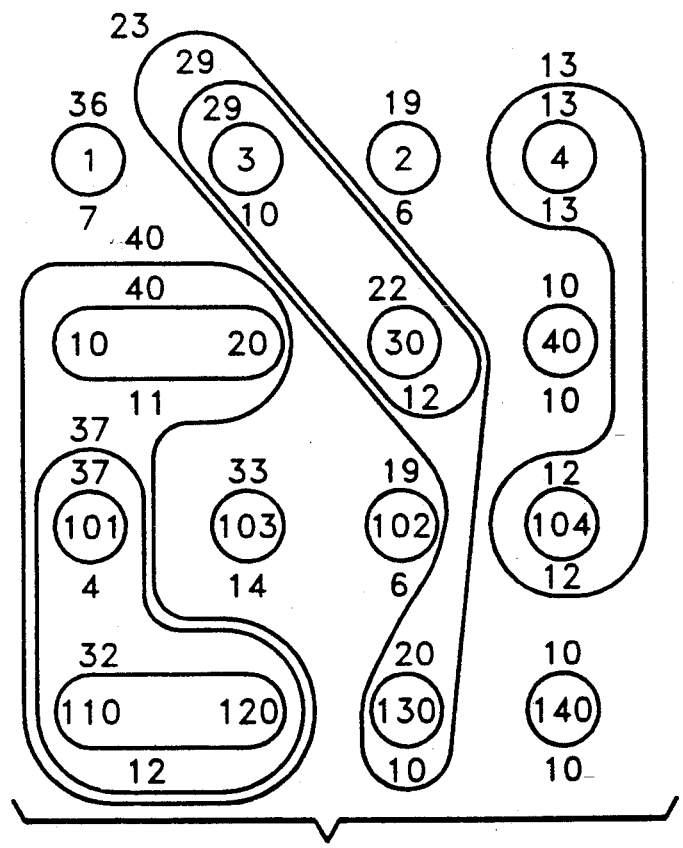

MODEL WITH constraints are dealt with next. FIG. 3(e) shows the information of column fifteen of FIG. 2 modeled into the diagram. MODEL WITH constraints are symbolized by the bold line encompassing the component tasks (or task groups). In this instance T110 is MODEL WITH constrained with T10. However, since both T110 and T10 are already grouped with other tasks, all of the tasks become grouped together. MODEL WITH groups can include tasks, compound tasks, SIDE WITH groups, or combinations of the above. MODEL WITH groups are unlike WITH or SIDE WITH in that they in fact are not performed either serially or in parallel. In fact, MODEL WITH groups are performed on different models of the product and could never be performed at the same time (to do so would require two separate units of product to be at the workstation at one time). Nonetheless, to account for multi model assembly lines, the line is modeled to account for any task (regardless of which model) which may be required in the assembly process. In order to assure that there will be adequate cycle time at each workstation, regardless of which model is being worked on, the line is balanced as if MODEL tasks are being performed in parallel. Therefore, the weight given to each task in a MODEL WITH group will be equal to the weight of the task with the greatest weight in the model group. This is indicated in FIG. 3(e) by placing the weight above MODEL WITH group.

E.

As before, the RPWT heuristic must be run again in order to adjust those tasks which precede tasks within the MODEL WITH group which have had their weights increased. This is shown in FIG. 3(e).

F.

Each task or task group in FIG. 3(e) can be considered as a model group, even if the 'group' contains only one task. Hence, T110/120/101/10/20 is one model group and T1 is another model group. This greatly simplifies the assignment process. As originally drawn, the precedence diagram contained sixteen separate tasks which had to be considered. Barring any constraints on the tasks the number of possible combinations would have been (16!) $2.1 \times 10^{13}$. In FIG. 3(e) the diagram has been reduced to nine groups, thus reducing the total number of permutations to (9!) $3.6 \times 10^5$. Naturally, no assembly line is going to have no constraints whatsoever on the tasks, however the example given is in fact a trivial one. Typically, one starts with a precedent diagram with hundreds of tasks which must be assigned to workstations. By grouping those tasks into a logical manner which is dictated by the very constraints of the line, the process is greatly simplified. Additionally, as each task or group in FIG. 3(e) is a model group, the priority of assigning tasks is established, not on a per-side per-model basis, but on a complete interrelated basis.

Having simplified the process to a manageable level and prioritized the order in which tasks should be assigned, the next step is to begin to assign the tasks to the workstation. To do so, tasks are assigned in descending order of weight. When assigning tasks to the workstations three criteria must be evaluated each time: 1) Has the task already been assigned to a workstation? 2) Will cycle time be exceeded by assigning the current task to the current workstation? 3) Will any of the constraints be violated by assigning the current task to the current workstation?

Figure 4A:
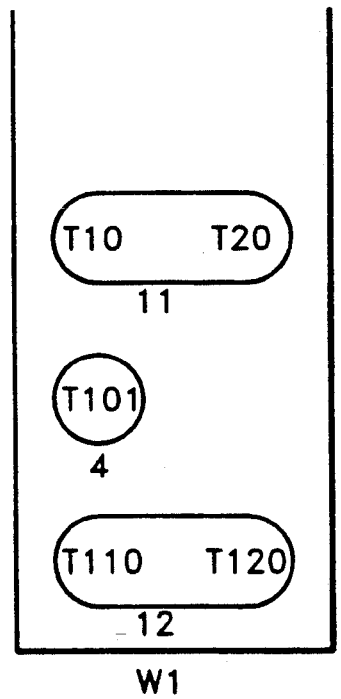
FIGS. 4a–g illustrate the progressive steps of assigning tasks to work-stations.

In the current example the model groups will be considered in the order T110/120/101/10/20, T1, T103, T130/30/3, T102, T2, T140/40, T4, T104. For convenience, these groups will be renamed M1 through M9 respectively. For illustrative purposes a cycle time of twenty seconds is imposed. The process begins with opening a workstation W1, and assigning M1 to it (M1 is then flagged as already assigned) as shown in FIG. 4(a). Note that although the tasks are assigned in a group, the individual task times must be tracked for tasks within the SIDE WITH and MODEL WITH groups. This is because these tasks are running in parallel, and although the tasks to be performed on the left side have reached the cycle time limit, additional tasks may still be added to the right side, until the cycle time has also been reached on that side.

Figure 4B:
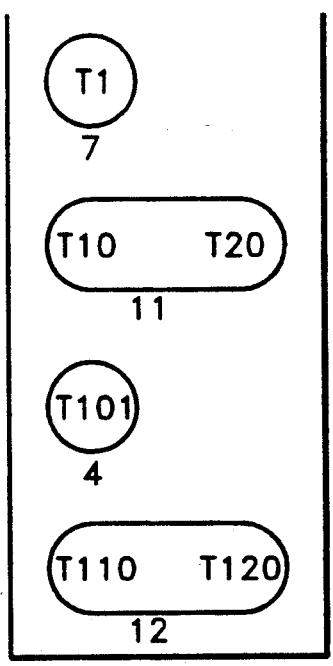

Having assigned M1 to W1 the next step is to check columns six, fourteen, and seventeen to see if this is an ALONE or SIDE ONLY, or MODEL ONLY task. If so, no other task, or no other task of a different side, or no other task of a different model, respectively, could be assigned to the same workstation. In this case, no task contained within M1 has any such constraint, so we are free to assign additional tasks to W1. The next group to be considered is M2. This group also has no ALONE or ONLY constraints. Additionally columns five, thirteen, and sixteen must be checked to see if adding M2 to W1 would violate any NOT WITH, SIDE NOT WITH, or MODEL NOT WITH constraints. In this case it would not. Lastly we must check to see if adding M2 to W1 would exceed the cycle time. M2 contains only T1 which is from the left side of model A. The cumulative task time for the left side of model A in W1 to this point is zero because no other left side model A tasks have yet been assigned to W1. Therefore M2 can also be assigned to W1 as shown in FIG. 4(b). M2 is flagged as having been assigned and processing continues.

Figure 4C:
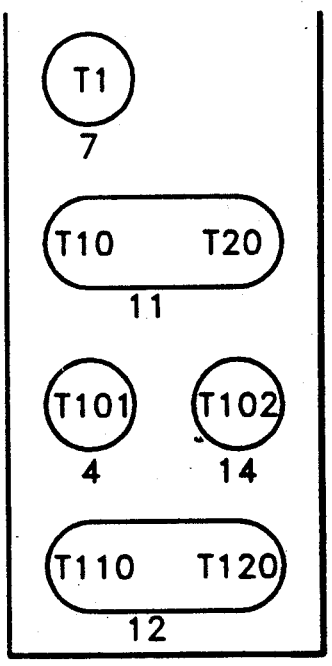

The same procedure is followed for M3. M3 contains only T103, which has no ALONE, or ONLY constraints, however, note in column five T103 has a NOT WITH constraint with T101. Therefore, although it would not exceed cycle time by doing so, M3 cannot be assigned to W1. To do so would violate the NOT WITH constraint. Therefore, M3 is set aside for later processing and M4 is next evaluated. M4 contains only T102 which only has the constraint (column 16) of a MODEL NOT WITH T3 and T30. Neither of these two tasks has yet been assigned to W1, so this will not preclude assigning M3. Checking the cumulative task time for the left side of model B we see that adding T102 results in a cumulative time of eighteen seconds, which is less than the cycle time. Therefore, M4 can be assigned to W1 and flagged as already assigned as shown in FIG. 4(c).

The next group to be evaluated for assignment is M5 which contains T130, T30, and T3. This group has many constraints which preclude it from assignment to M1, the first of which is the NOT WITH constraint between T130 and T110 (column 5). Since T110 is already assigned to W1, M5 is passed and processing continues with M6. Note that by having the tasks grouped this way, all the tasks within M5 can be evaluated as invalid for W1 on the basis of evaluating only one constraint of T130. This strategy greatly decreases the computational time for solving the line balance. In large complex lines the decrease in computational time becomes very significant.

Figure 4D:
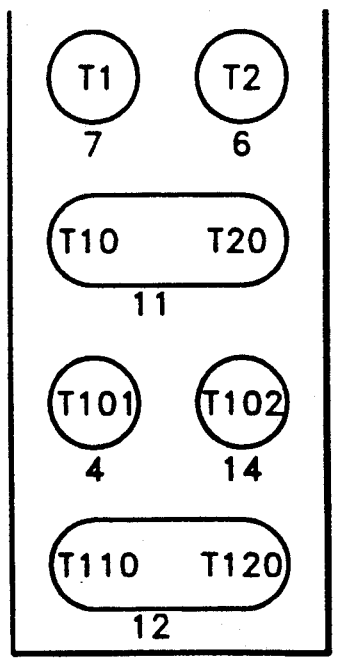

Proceeding to M6 which contains T2 only, the only constraints are NOT WITH T3, MODEL NOT WITH T30, neither of which have been assigned to W1. The cumulative task time for the left side of model A will be thirteen once T2 is added to W1, which does not exceed the cycle time. Therefore, M6 is assigned to W1, and flagged as already assigned as shown in FIG. 4(d).

M7 which contains T140 and T40 has no constraints which prevent its assignment to W1, however doing so would exceed the cycle time for both the right side of model A and of model B. Therefore, M8 is considered next, but again adding T104 to W1 would exceed the cycle time. The same is true for T4 of model M9. Therefore, W1 is closed to further assignments and the process is continued with a new workstation W2.

Figure 4E:
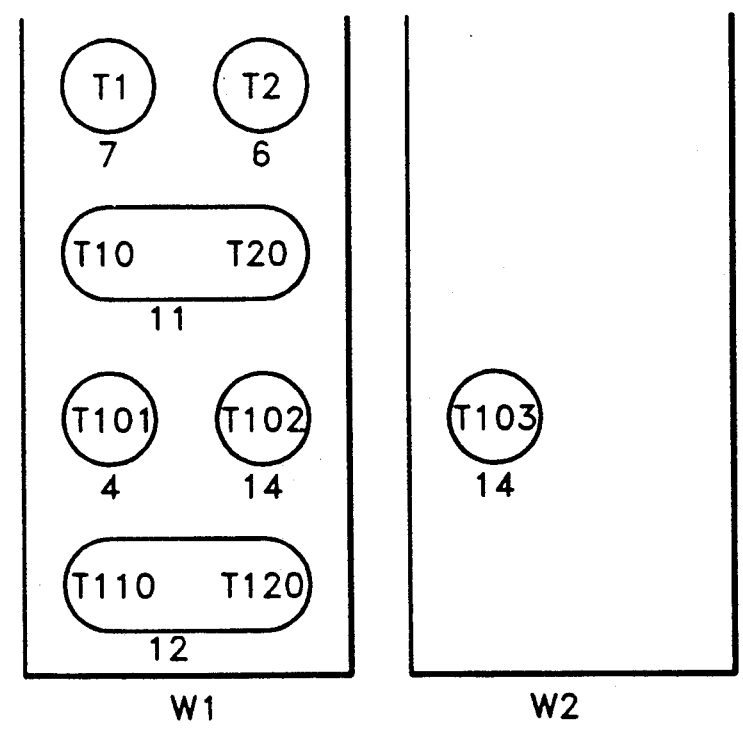

The model groups are considered for assignment to W2 in order of their ranked positional weight, just as done previously. M3 containing T103 is considered first because it is the group with the greatest weight which has not been flagged as already assigned. M3 is assigned to W2 and flagged as already assigned as shown in FIG. 4(e).

Figure 4F:
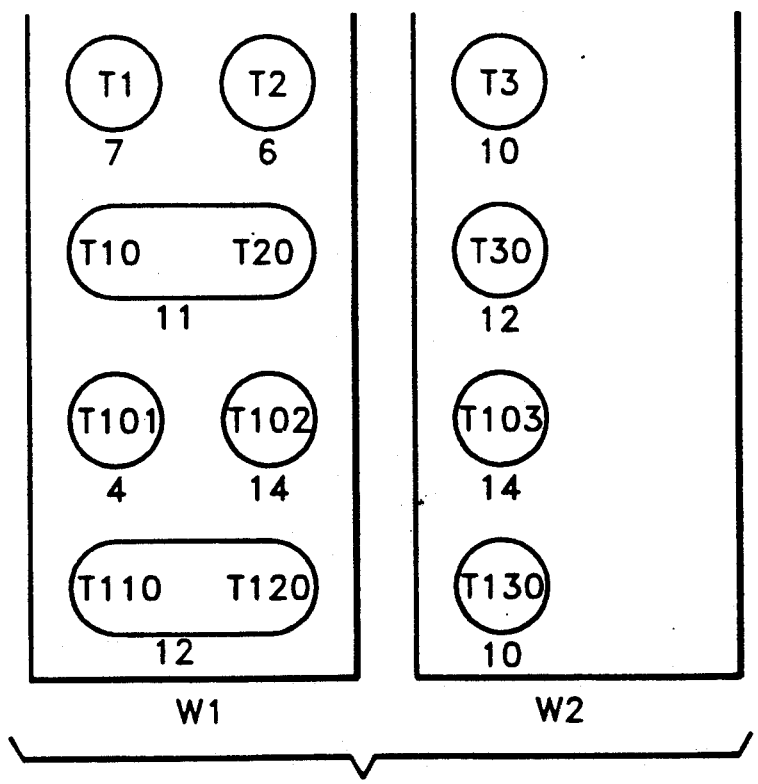
Figure 4G:
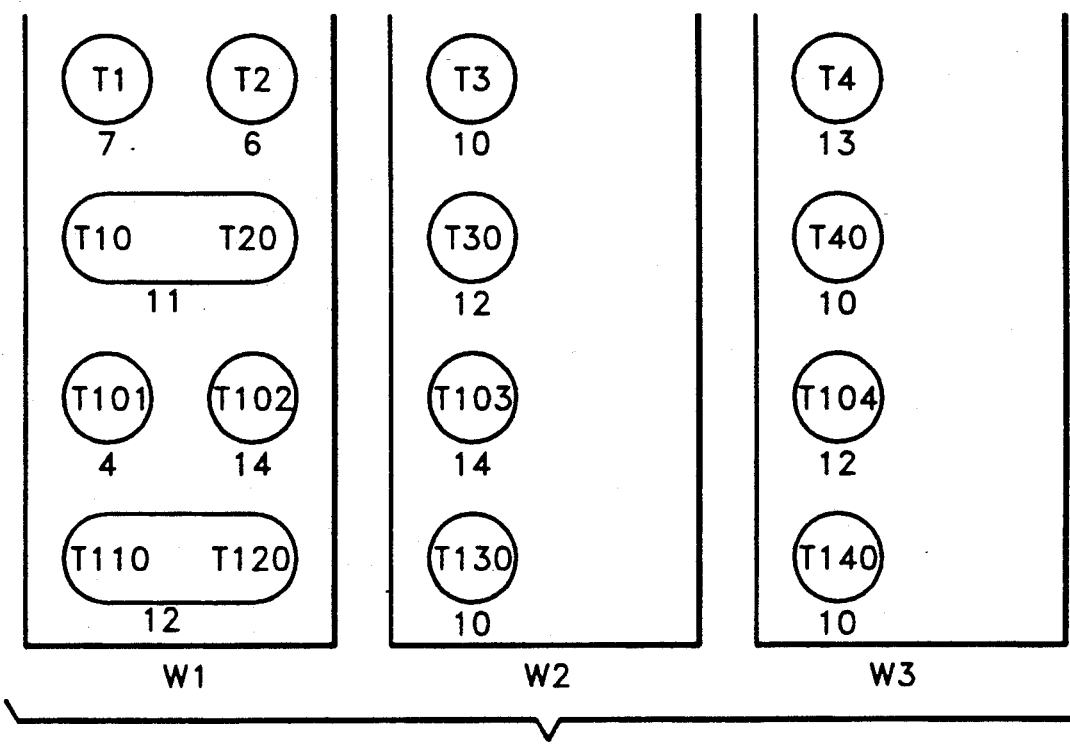

Tasks T130, T30, and T3 have NOT constraints which prevent them from being assigned to W2 along with T103, so M5 is next assigned to W2 and flagged as already assigned as shown in FIG. 4(f). M7 is next considered, but note that adding T140 to W2 would exceed the cycle time. Therefore, M7 is passed and processing continues with M8. The same is true for M8 and M9. Although in both cases, adding the tasks to W2 would violate no constraints, the cycle time would be exceeded by doing so. Therefore, W2 is closed with only T130, T103, T30, and T3 assigned to it. W3 is opened and T140 and T40 are assigned to it first, followed by T104 and T4. The complete assignment of tasks to workstations is shown in FIG. 4(g).

By grouping the tasks into model groups based on their WITH constraints the number of objects that needed to be considered was reduced from sixteen tasks to nine model groups. Further, rather than having to evaluate each tasks within a model group, it was possible to reject all the tasks within a model group based on the incompatibility of one task within the group to some task already assigned to the workstation. In a typical modern assembly line this type of simplification of the balancing problem can make the difference between a practical assembly line balancer and one which is theoretically possible but completely impractical for real-world applications.

More importantly, by taking the various SIDE and MODEL constraints into account at the outset, the preferred embodiment allows the line modeler take advantage of the capability to perform tasks on different sides of the product in parallel. Furthermore, this approach allows for any mix of models which product demand may dictate.

A second preferred embodiment maximizes balance efficiency by performing a step-wise optimization technique to determine whether a lower cycle time can be used then the user-defined cycle time without requiring any more workstations then were required by the user-defined cycle time. Alternatively, the step-wise optimization technique determines whether fewer workstations can be used then the user-defined number of workstations without requiring any greater cycle time then was required by the user defined workstations. This concept will be explained in detail, infra. Additionally a second preferred embodiment maximizes line efficiency by creating parallel workstations in order to assign more tasks to a given workstation without violating the maximum cycle time constraint. The second preferred embodiment involves the details disclosed in the first preferred embodiment, and the following features:

The second preferred embodiment can balance a line two ways. Firstly, the user can input a maximum cycle time limit in which case the line balancer derives the minimum number of workstations which can perform all the tasks required by the line (for the given cycle time). Secondly, the user can input a maximum number of workstations in which case the balancer derives the minimum cycle time for which the given number of workstations can perform all the required tasks. In either case one criterion determinative of the resulting efficiency of the line is the user-defined input. Greater efficiency may result, however, by using the resulting line balance as a starting point for a bisectional optimization technique, rather than as a final result.

To demonstrate, consider the case where the user defines a maximum cycle time (U). The outcome of the line balancer results in a minimum number of workstations (X) which can perform all the tasks required by the line. Therefore, the resulting line contains X workstations, at each of which the product is available to have tasks performed for U seconds (or minutes, or whatever unit of time the user defines). As shown previously, some or perhaps all of the workstations will require less then U seconds, which results in balance delay. In fact, it is very rare for a line balance to result in every workstation using the full U seconds with no idle time. The assembly line is efficiently balanced as regards the input cycle time (U); however, there may be a cycle time (O) which is less then U, but which requires no more then X workstations to balance the line. If this is the case O results in greater production rate then U (production rate is inversely proportional to cycle time) and additionally, O generally results in less balance delay.

To determine if a more efficient cycle time O exists, the line balancer proceeds as follows:

For a given assembly line, the nominal cycle time (N) is defined as the sum of all the tasks times divided by the number of workstations (in the current case X). This nominal cycle time will be a best case time which would result if tasks could be assigned to workstations with no precedence or grouping constraints, which for all intents and purposes is not possible to achieve. However the nominal cycle time is useful as defining a minimum cycle time which is approachable.

The maximum approachable limit is U, the user-defined cycle time, naturally, since this was defined by the user as a maximum. The goal of the optimization process is to determine what minimum cycle time in this range results in a line balance which requires no more then X workstations. This is accomplished by an iterative process in which a cycle time is chosen which is midway in the interval between the previous cycle time and the appropriate limit.

As an example, assume an assembly line balance, in which the user defined cycle time is twenty seconds, results in a ten workstation line. The balancer first determines the nominal cycle time (derived by dividing the sum of all the tasks by ten workstations) which in this case is determined as six. The midpoint of the interval between these two limits is fourteen seconds. The balancer then re-runs the line with a fourteen second cycle time.

Two possible outcomes result from re-running the line at fourteen seconds: 1) The resulting balance requires more than X workstations. 2) The resulting balance requires X workstations.

In the first instance, the balancer attempts to find a cycle time between fourteen and twenty seconds which will result in a balance which requires X stations. Again the midpoint of the interval between the limits is chosen, in this case seventeen. Again, the two above enumerated outcomes are possible. If seventeen seconds results in more than X workstations, the balancer re-runs the line with a cycle time midway between twenty and seventeen seconds (in this case rounded off to eighteen seconds). If however, the seventeen second balance results in X workstations, a more efficient line results. It is still possible, however that an even more desirable cycle time is possible. Therefore, in this case the balancer re-runs the line with a cycle time midway between seventeen and fourteen seconds (in this case rounded off to fifteen). With each step of the iterative process, the cycle time selected is midway between the previously selected cycle time and either the upper or lower limit (depending on whether the previously selected cycle time resulted in X or more than X workstations).

In other words, depending on whether the cycle time results in more than X workstations, the balancer adjusts the cycle time either up or down until a minimum cycle time which requires only X workstations is determined. This is efficiently done by choosing the cycle time in half interval increments in order to narrow down to a result as quickly as possible.

The preceding explanation also applies to the second possible outcome whereby the selected cycle time results in X workstations, except in this case, rather than selecting successively larger cycle times, the balancer selects successively smaller cycle times (in half interval increments as described above) until selecting a smaller cycle time would result in more than X workstations. Then the interval between this cycle time and the previously chosen cycle time is incremented until the minimum cycle time which results in no more than X workstations is determined.

Therefore, by starting with the number of workstations required by the user-defined cycle time, the line balancer evaluates successive cycle times in half-interval increments until either a minimum cycle time which results in X workstations is found, or a pre-set number of iterative cycles has lapsed—in which case it is improbable that a more efficient cycle time can be found than the one defined by the user.

The above discussion applies when the user inputs a maximum number of workstations which can be defined, and the balancer results are in terms of cycle time. In this case the line is re-balanced successively fewer workstations in a similar iterative process to the one described supra until the cycle time is impacted, at which point an optimal number of workstations has been derived.

An additional feature of the second preferred embodiment is now discussed, namely relaxing the maximum number of parallel workstations attributes in the knowledge base to display how creating parallel workstations may impact the resulting line balance. This feature allows a user to run various line balance scenarios to analyze how parallel workstations may impact the line performance. Often the resulting decrease in cycle time and corresponding increase in production rates justifies the additional expense of purchasing additional equipment or training new operators. By performing the analysis, the balancer allows the user to evaluate many options which are not apparent from the line balance as originally constrained by the user's input.

A workstation W1 is parallel to another workstation W2 when the same tasks are assigned to both. Using two workstations in parallel results in a lower overall cycle time required, and may also result in a decreased balance delay. To illustrate, consider an assembly line in which it is desired to limit the cycle time to a maximum of ten seconds, in order to meet production quotas. Task T10, for example a drilling task, has a task time of twelve seconds. As previously stated, in a conventional assembly line balancer this line could not be balanced because the cycle time had to at least equal the task time of the longest task. In other words, we are trying to perform a twelve second task at a workstation wherein the product is only present for ten seconds. It is possible that a human operator could follow the product outside of his workstation in order to fulfill the last two seconds of the task time, but this would detract from the time available for the next unit, thus causing an eventual log-jam. Additionally for a fixed machine this is impossible. If, however, the drilling task was assigned to two workstations, alternating between them, the goal can be achieved. In other words, the first unit of product is drilled at W1, and the next unit of product is drilled at W2. Although the task time for each workstation is still twelve seconds, the cumulative task time of the two stations working in parallel is equivalent to six seconds, which is well within the cycle time limit. So in this way, the assembly line can be balanced with task times which exceed the cycle time.

To see how running workstations in parallel can impact the cycle time, and balance delay consider the following example of a simple assembly line with a cycle time of twenty seconds and task times as follows:
T1 . . . 20 seconds
T2 . . . 15 seconds
T3 . . . 15 seconds
T4 . . . 10 seconds.

The only constraint on this line is that T1 is NOT WITH T2 and the precedence constraints are per the numerical order (T1 precedes T2 which precedes T3 which precedes T4). Since grouping any tasks together at a workstation results in a cumulative task time which exceeds the cycle time, a balance of this line results in four serial workstations, each of which has one task assigned to it. The balance delay for this resulting assembly line is twenty-five percent idle time.

The line can be re-balanced with much greater efficiency by using the parallel workstation concept. Assigning T2, T3, and T4 to a workstation results in a cumulative task time of forty seconds. However, running two workstations in parallel results in a twenty second throughput, which satisfies the twenty second cycle time. In other words, T1 is assigned to W1 with a cumulative task time of twenty seconds. T2, T3 and T4 are assigned to parallel workstations W2A and W2B with a total cumulative task time of forty seconds. This forty second cumulative task time is divided between the two parallel workstations, resulting in a twenty second equivalent cycle time. In this case the balance delay has been reduced to zero, and the total number of workstations has been reduced to three. It is important to note that the tasks T2, T3, and T4 are not split between the two parallel workstations. All three tasks are done at each workstation, with successive units of product alternating between the two.

A complex assembly line can have three, four, or more workstations run in parallel. More than one group of tasks can be run in parallel workstations, which means there may be several different parallel workstations set-ups on a single line. The criteria to judge in determining whether a task should be performed at parallel workstations include the number of operators with the skills to perform the given task, space constraints of the manufacturing floor, machines available for performing the task, and the cost of the above versus the benefit of faster production rates.

Whether a task is assigned to parallel workstations during the balancing process is determined by the knowledge base. The maximum number of parallel workstations to which a task can be assigned (based on the above listed criteria as well as others) is an attribute assigned to each task. This maximum number of parallel workstations is input by the line designer in column seven of FIG. 2, and henceforth becomes an attribute of the task just as WITH grouping is an attribute of the task.

Often, however, a line designer restricts the number of parallel workstations to which a task can be assigned on the basis of existing equipment or on empirical data for which the value of parallel workstations has not been established. This restriction on the line leads to inefficiencies in the design of the line. An aspect of the second preferred embodiment is that the line can be balanced both with the restrictions defined by the user to derive a balance, and with the restrictions on parallel workstations relaxed. This allows the line designer to compare the efficiency (in terms of balance delay) and the production rates (in term of station time). Often the increased efficiency and production rates more than make up for the increased initial costs of additional equipment or operator training.

Figure 5:
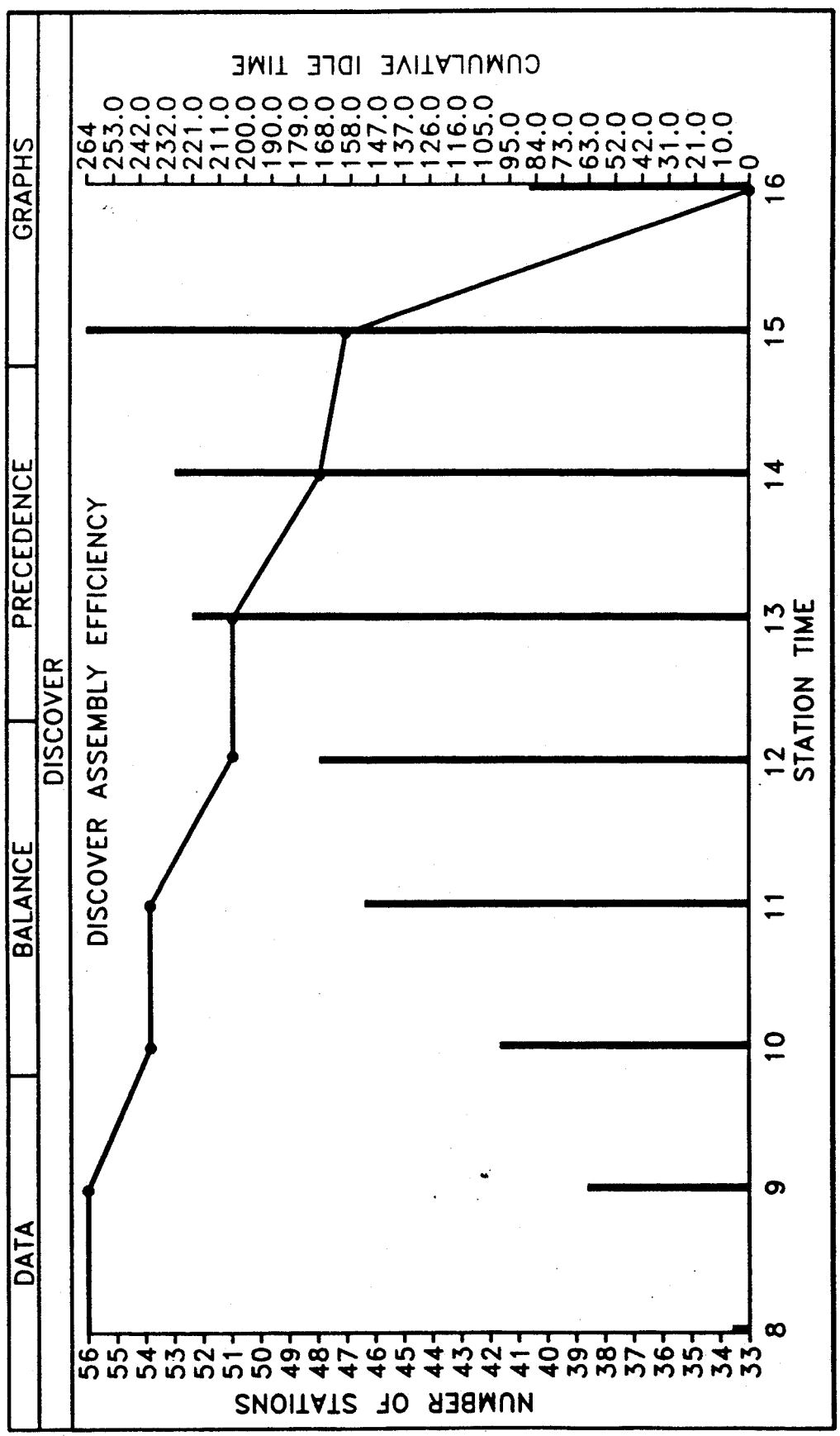
FIGS. 5–6 illustrate the output format for a line balance.
Figure 6:
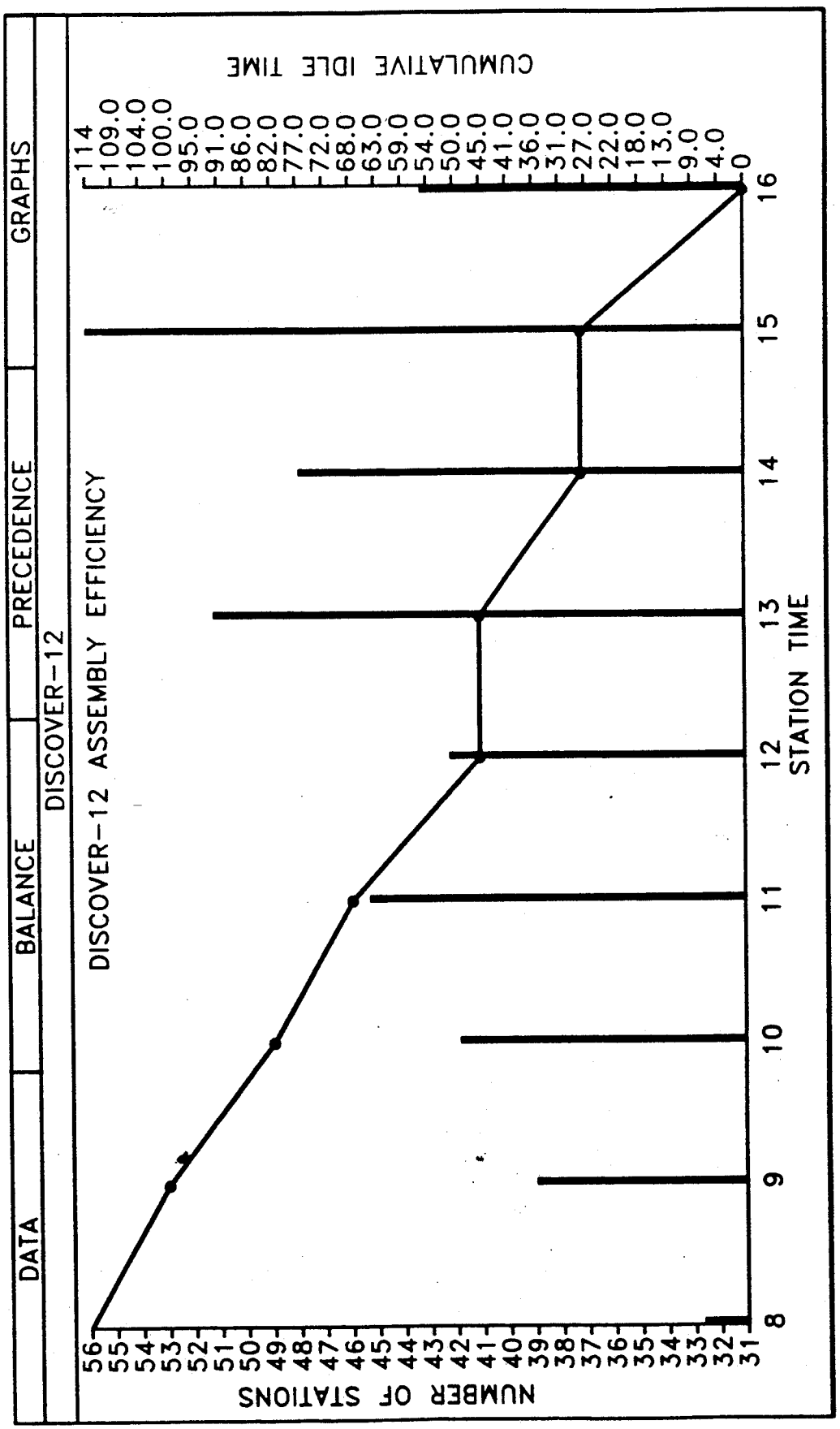

Compare FIG. 5 and FIG. 6. Both are the resulting output of the same assembly line. In FIG. 5, the user-defined maximum parallel workstations constraints were followed, whereas in FIG. 6, these constraints were relaxed. Analysis of the results requires an explanation of the graphical output format shown in the figures. FIG. 5 is used as an example.

The balancer displays the line balance results in a user-friendly and clear format. The user inputs a range of cycle times for which he would care to see the results and the graphs are automatically generated, with the range of stations times displayed as the abscissa of the graph. Each graph includes two ordinates. The left side ordinate contains the number of workstations required for the given cycle time and the data associated with this ordinate is represented by a line graph. The right side ordinate contains the cumulative idle time for the associated cycle time and number of workstations. This data is represented by a bar graph. Therefore, for each point on the abscissa there are two data points: the associated number of workstations and the associated cumulative idle time. In this way all of the essential features of the line balance are readily and clearly displayed.

For instance, in FIG. 5, the user selected a range of eight to sixteen seconds cycle times. At eight seconds the line requires fifty-six workstations (derived from the line graph and the left hand ordinate) and the cumulative idle time (or balance delay) is approximately six seconds (derived form the bar graph and the right hand ordinate). When the cycle time is increased to nine seconds, fifty-six workstations are still required, however the cumulative idle time (as would be expected) has increased—to about sixty-two seconds. Increasing the cycle time by one second was not enough to allow any more efficient 'packing' of the tasks in the workstations. Therefore the same tasks are performed at each workstation, but there is an additional second to perform them, and hence the cumulative idle time is increased by fifty-six seconds (one second for each workstation).

When the cycle time is increased to ten seconds, fewer stations are required to 'pack' all tasks. However, again the cumulative idle time increases. It is to be expected that generally the cumulative idle time will increase each time the cycle time increases because the cumulative task time (the sum of the task times of all the tasks) remains constant. Therefore, by increasing the cycle time the time available to perform the same amount of work is increasing thus resulting in increased idle time. The exception to this is when increasing the cycle time results in many fewer workstations required wherein each workstation is 'packed' to near capacity.

More significant, however, is how the number of workstations is impacted by the increase in cycle time. As more time is available at each workstation, more tasks can be performed at each station, and hence, the total number of stations required decreases, as shown. The graph makes clear that given a choice between eight and nine seconds cycle time, eight seconds should be chosen because there is no corresponding decrease in workstations to offset the increase in idle time. The same is true given a choice between ten and eleven seconds, and between twelve and thirteen seconds.

Note, however, the decrease in workstations required between thirteen and fourteen seconds versus the increase in idle time. At thirteen seconds, fifty-one workstations are required, whereas at fourteen seconds only forty-eight are needed. Because these workstations are packed more efficiently, however, the cumulative idle time increases only by about eleven seconds. Clearly, the fourteen second cycle time would be advantageous over the thirteen second cycle time, providing this would not violate some production rate quota. Odds are that the savings in line cost would make up for the slightly lowered production rate.

The most significant data point in the graph of FIG. 5 is for sixteen seconds cycle time. At sixteen seconds, the cycle time is large enough to allow many tasks to be assigned to the same workstation. Additionally, because of the typical task times the tasks can be very efficiently assigned to the workstations with a sixteen second cycle time. In fact, the cumulative idle time is less at sixteen seconds then any other cycle time above nine seconds (because at sixteen seconds a very few workstations are packed very efficiently). The optimum cycle time for this range therefore is sixteen seconds. However, again, production quotas and production rate requirements may preclude the line designer from running the line at a sixteen second cycle time. Displaying the relevant factors in this format facilitates analysis of the resulting line balances.

Having illustrated the graphical output format in FIG. 5, comparison of FIG. 5 with FIG. 6 demonstrates the benefits in line efficiency which can be gained by relaxing the user-defined maximum parallel workstations constraints. Note that the scale of the left hand ordinate (number of workstations) is constant in both figures, however the scale of the right hand ordinate (cumulative idle time) is different between the figures. The range of cumulative idle times is much lower for the graph in FIG. 6. This is because of the increased efficiency which can be obtained in assigning tasks to parallel workstations over a strictly serial format.

Figure 7:
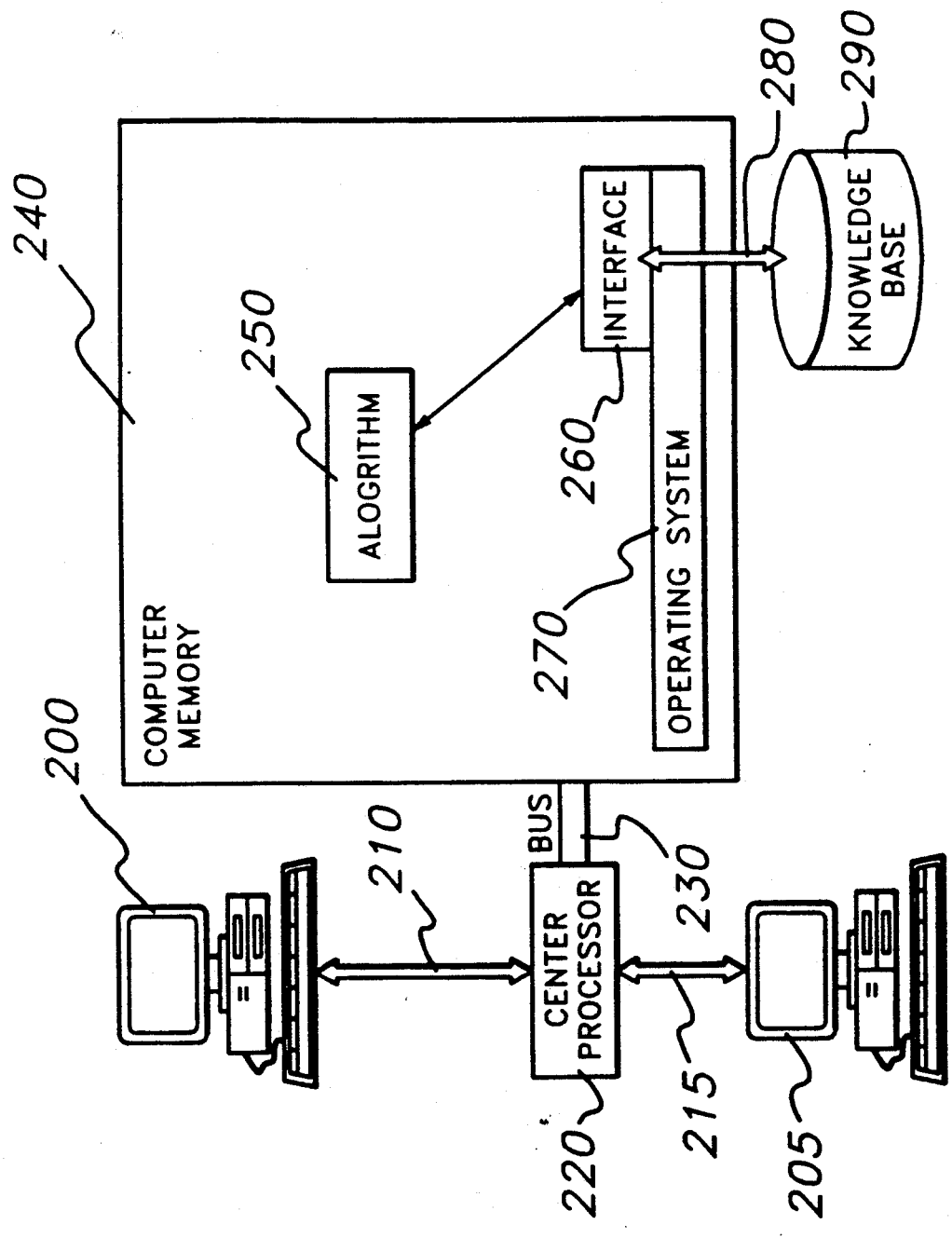
FIG. 7 illustrates a system for balancing the assignment of a plurality of tasks for a plurality of models of a product according to the present invention.

FIG. 7 illustrates a system for balancing the assignment of a plurality of tasks for a plurality of models of a product, each of which models has a plurality of sides, to a plurality of workstations 200,205 based on precedence and grouping constraints. (It should be realized that although only two workstations are shown, more may be included in such system. Additionally, although PC workstations are shown for example purposes only, as discussed above, various manufacturing operations, inspections, tests, and/or handling operations are performed at workstations along the line in a serial manner, the result of which is the emergence of a final product at the end of the line). Workstations 200,205 address central processor unit 220 via buses 210,215. CPU 220 in turn communicates with computer memory 240 via bus 230. Within computer memory 240 resides algorithm 250, operating system 270, and interface 260. Task parameters and constraints are input and stored within knowledge base 290 via interface bus 280. Algorithm 250 performs an iterative balancing and grouping process and outputs a display to at least one of the workstations 200,205, wherein the output format corresponds to an input format. Examples of such display are seen in FIGS. 5 and 6, discussed above. CPU 220, buses 210,215, 230, memory 240, operating system 270, and interface 260 are known in the art and as such will not be further discussed herein.

Recall from the above discussion that running workstations in parallel allows groups of tasks which would have otherwise exceeded the cycle time to be assigned to the same workstation. In this way a group of tasks that previously may have required three serial workstations can all be assigned together and run on two workstations running in parallel. Therefore, for any given cycle time the number of overall workstations required will usually be less, as is shown to be the case when comparing FIG. 5 and FIG. 6. Recall, however, that parallel workstations require additional trained operators, possible additional tools and machinery, and additional floor space. Therefore, an experienced and knowledgeable line designer must still make decisions regarding the costs and benefits for various parallel and serial workstations schemes. By providing a clear and readily obtained graphical format which shows the analysis of both user-defined parallel constraints and no parallel constrains, the line balancer allows a line designer to analyze many options that might have otherwise been too tedious, expensive, or time-consuming to consider.

What is claimed is:

1. A method for balancing the assignment of a plurality of tasks to a plurality of workstations, comprising the steps of:
   (a) providing a plurality of partially ordered sets of tasks, each of which tasks has an assigned task time;
   (b) linearly ordering each of said sets by a ranking technique based on said task times;
   (c) grouping a plurality of said tasks between said sets on the basis of a first class of constraints;
   (d) linearly reordering each of said task sets by a ranking technique based on said task times wherein the rank of a task in one of said groups is replaced by the maximum of the ranks of the tasks in said group during said reordering; and
   (e) selecting for assignment to workstations groups of tasks in order of their rank and without violating a first plurality of constraints, wherein each of said workstations has a cycle time.

2. The method of claim 1 wherein said ranking technique ranks said tasks by said task time plus the sum of all said task times of all subsequent tasks.

3. The method of claim 1 comprising the further steps of:
   (a) repeating the steps (b)-(e) at least once with a different cycle time for each repetition; and
   (b) selecting one of the resulting assignments of tasks to workstations.

4. The method of claim 1, comprising the further steps of:
   (f) regrouping a plurality of said tasks between said sets on the basis of a second class of constraints; and
   (g) second linearly reordering each of said task sets of a ranking technique based on said task times wherein the rank of a task in one of said regroups is replaced by the maximum of the ranks of the tasks in said regroup of step (f) during said second reordering;
   (h) wherein step (e) applies to said regroups instead of said groups.

5. The method of claim 4 wherein said second ranking technique ranks said tasks by said task time plus the sum of all said task times of all subsequent tasks.

6. The method of steps (a)-(b) of claim 4 comprising the further steps of:
   (a) repeating the steps at least once with a different cycle time for each repetition; and
   (b) selecting one of the resulting assignments of tasks to workstations.

7. The method of claim 4, wherein said ranking technique of step (g) is the same as the ranking technique of step (d).

8. The method of steps (b)-(e) of claim 1 comprising the further steps of:
   (a) repeating the steps at least once with a different cycle time for each repetition; and
   (b) selecting one of the resulting assignments of tasks to workstations.

9. The method of claim 1, further comprising the step of displaying a range of possible outcomes of an assembly line balance by providing at least one of a plurality of displays, said plurality including:
   (i) a display of the number of required workstations and the cumulative idle time for an input range of cycle times;
   (ii) a display of the required cycle time and the cumulative idle time for an input range of the number of required workstations;
   (iii) a display of the number of required workstations and the cumulative idle time for an input range of production rates.

10. A system for assembly line balancing the assignment of a plurality of tasks for a plurality of models of a product to a plurality of workstations based on precedence and grouping constraints, comprising:
    (a) a knowledge base wherein task parameters and said precedence and grouping constraints are input and stored; and
    (b) processing circuitry coupled to said knowledge base for linearly ordering each of said tasks by a ranking technique based on said task parameters, grouping of a plurality of said tasks on the basis of said grouping constraints, linearly reordering of each of said tasks by a ranking technique wherein the rank of a task in one of said groups is replaced by the maximum of the ranks of the tasks in said group during said reordering, and selecting for assignment to said workstations of groups of tasks in order of their rank and without violating said precedence and grouping constraints.

11. A method for balancing the assignment of a plurality of tasks to a plurality of workstations, wherein said tasks are for a plurality of models of a product, each of which models has a plurality of sides, comprising the steps of:
    (a) providing for each of said sides of each of said models a partially ordered sets of tasks, each of which tasks has an assigned task time;
    (b) linearly ordering each of said sets by a ranking technique based on said task times;
    (c) grouping a plurality of said tasks between said sides on the basis of a first class of constraints;
    (d) linearly reordering each of said task sets by a ranking technique based on said task times wherein the rank of a task in one of said groups is replaced by the maximum of the ranks of the tasks in said group during said reordering;
    (e) regrouping a plurality of said tasks between said models on the basis of a second class of constraints;
    (f) second linearly reordering each of said task sets by a ranking technique based on said task times wherein the rank of a task in one of said regroups is replaced by the maximum of the ranks of the tasks in said regroup of step (e) during said second ranking; and
    (g) selecting for assignment to workstations regroups of tasks in order of their rank and without violating a first plurality of constraints, wherein each of said workstations has a cycle time.

12. The method of claim 11 wherein said ranking technique ranks said tasks by said task time plus the sum of said task times of all subsequent tasks.

13. The method of claim 11 wherein said cycle time is equal for all of said workstations.

14. The method of claim 11 wherein, given n workstations running in parallel, and a nominal cycle time T, the cycle time of each of said n workstations is $n \times T$.

15. The method of claim 11, wherein said ranking technique of step (d) is the same as the ranking technique of step (f).

16. The method of claim 7, further comprising the step of displaying a range of possible outcomes of an assembly line balance by providing at least one of a plurality of displays, said plurality including:
(i) a display of the number of required workstations and the cumulative idle time for an input range of cycle times;
(ii) a display of the required cycle time and the cumulative idle time for an input range of the number of required workstations;
(iii) a display of the number of required workstations and the cumulative idle time for an input range of production rates.

* * * * *